(12) United States Patent
Burton et al.

(10) Patent No.: US 11,301,886 B2
(45) Date of Patent: Apr. 12, 2022

(54) SYSTEM, METHOD, AND COMPUTER PROGRAM PRODUCT FOR DETERMINING A CONTROL ACCOUNT THAT CORRESPONDS TO AN EXPOSED ACCOUNT

(71) Applicant: Visa International Service Association, San Francisco, CA (US)

(72) Inventors: William J. Burton, San Jose, CA (US); Tanya Soluk, San Carlos, CA (US); Qingyuan Zhang, Los Altos, CA (US); Jingjing Zhang, Redwood City, CA (US); Bingxin Mao, Shanghai (CN); Linjun Chen, San Jose, CA (US); Jiaqi Xu, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 95 days.

(21) Appl. No.: 16/820,074

(22) Filed: Mar. 16, 2020

(65) Prior Publication Data

US 2020/0294072 A1 Sep. 17, 2020

Related U.S. Application Data

(60) Provisional application No. 62/818,939, filed on Mar. 15, 2019.

(51) Int. Cl.
*G06Q 30/00* (2012.01)
*G06Q 30/02* (2012.01)
(Continued)

(52) U.S. Cl.
CPC ....... *G06Q 30/0204* (2013.01); *G06F 16/245* (2019.01); *G06N 5/04* (2013.01);
(Continued)

(58) Field of Classification Search
CPC .. G06Q 30/0204; G06Q 40/02; G06F 16/245; G06N 5/04
See application file for complete search history.

(56) References Cited

U.S. PATENT DOCUMENTS 10,417,658 B1* 9/2019 Tsemekhman ..... G06Q 30/0246
2011/0313900 A1* 12/2011 Falkenborg ........ G06Q 30/0202
705/30
(Continued)

OTHER PUBLICATIONS

Perlich, C., Dalessandro, B., Raeder, T. et al. Machine learning for targeted display advertising: transfer learning in action. Mach Learn 95, 103-127 (2014). https://doi.org/10.1007/s10994-013-5375-2.*

*Primary Examiner* — Ilana L Spar
*Assistant Examiner* — Allan J Woodworth, II
(74) *Attorney, Agent, or Firm* — The Webb Law Firm

(57) ABSTRACT

Provided is a method including determining a combined plurality of accounts, determining, for each account of the combined plurality of accounts, aggregate transaction data associated with a plurality of transactions involving the account; determining a first cohort level group including a group of exposed accounts and controls accounts; determining a first segment level group of accounts from the first cohort level group of accounts; generating a prediction model based on a plurality of control accounts that are included in the first segment level group of accounts; identifying a first exposed account of a plurality of exposed accounts; determining a first control account of the plurality of control accounts that corresponds to a first exposed account using the prediction model; and outputting a report comprising data associated with the first control account that corresponds to the first exposed account. Systems and computer program products are also provided.

16 Claims, 3 Drawing Sheets

(51) Int. Cl.
*G06F 16/245* (2019.01)
*G06Q 40/02* (2012.01)
*G06N 5/04* (2006.01)
*G06N 20/00* (2019.01)

(52) U.S. Cl.
CPC ............ *G06Q 40/02* (2013.01); *G06N 20/00* (2019.01); *G06Q 30/0226* (2013.01)

(56) References Cited

U.S. PATENT DOCUMENTS

| | | | | |
|---|---|---|---|---|
| 2013/0085804 | A1* | 4/2013 | Left | G06Q 30/0219 705/7.29 |
| 2016/0086212 | A1* | 3/2016 | Tietzen | G06Q 30/0226 705/14.27 |
| 2017/0353827 | A1* | 12/2017 | D'Aiberto | H04W 4/02 |
| 2020/0410549 | A1* | 12/2020 | Buchalter | G06Q 30/0249 |

* cited by examiner

SYSTEM, METHOD, AND COMPUTER PROGRAM PRODUCT FOR DETERMINING A CONTROL ACCOUNT THAT CORRESPONDS TO AN EXPOSED ACCOUNT

CROSS-REFERENCE TO RELATED APPLICATION

The present application claims priority to U.S. Provisional Patent Application No. 62/818,939, filed on Mar. 15, 2019, the disclosure of which is hereby incorporated by reference in its entirety.

BACKGROUND

1. Field

This disclosure relates generally to event measurement and, in one particular embodiment, to a system, method, and computer program product determining a control account that corresponds to an exposed account.

2. Technical Considerations

A loyalty program (e.g., a rewards program, points program, and/or the like) may include a structured marketing strategy to encourage customers to conduct transactions with a merchant associated with the loyalty program. The structured marketing strategy may include a benefit provided to the customers to encourage the customers to make purchases of goods from the merchant and/or to use a service of the merchant. A loyalty program may include a benefit provided based on types of commerce (e.g., in person transactions, e-commerce, and/or the like), and each type of commerce may have varying features and/or benefit schemes.

Further, a merchant may desire to measure an impact of an event on spend behavior of an account or a set of accounts. The event may be defined as an action or activity that happens at a specific point in time associated with a loyalty program. For example, the event could be an email offer associated with or enrollment in a loyalty program. However, to measure an impact of an event on spend behavior of an account or a set of accounts, it may be necessary to determine a control group and a study group.

SUMMARY

The features and characteristics of the present disclosure, as well as the methods of operation and functions of the related elements of structures and the combination of parts and economies of manufacture, will become more apparent upon consideration of the following description with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
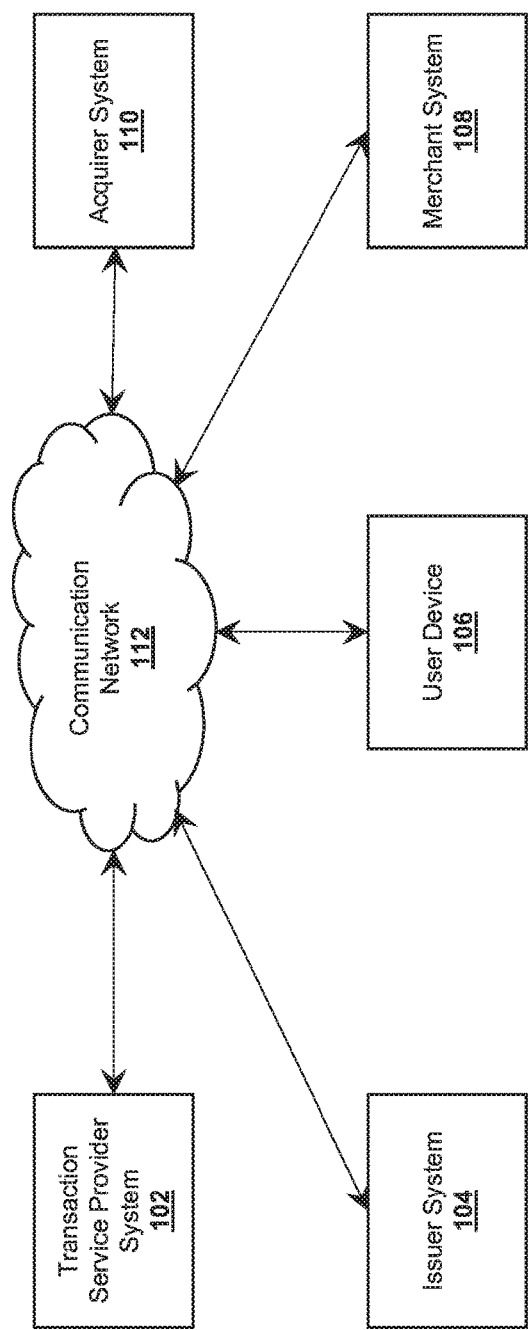
FIG. 1 is a diagram of a non-limiting embodiment of an environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer" may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile device applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable payment devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile device application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile device application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more devices, such as processors, storage devices, and/or similar components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, personal digital assistants (PDAs), wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more devices, such as processors, storage devices, and/or similar computer components that communicate with client devices and/or other devices over a network, such as the Internet or private networks and, in some examples, facilitate communication among other servers and/or client devices.

As used herein, the term "system" may refer to one or more devices or combinations of devices such as, but not limited to, processors, servers, client devices, software applications, and/or other like components. In addition, reference to "a server" or "a processor," as used herein, may refer to a previously-recited server and/or processor recited as performing a previous step or function, a different server and/or processor, and/or a combination of servers and/or processors. For example, as used in the specification and the claims, a first server and/or a first processor that are recited as performing a first step or function may refer to the same or different server and/or a processor recited as performing a second step or function.

As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Non-limiting embodiments of systems, methods, and computer program products described herein may enable the determination of a control account that corresponds to an account that was exposed to an event associated with a merchant. For example, embodiments described herein may allow for more accuracy and/or more efficiency (e.g., using less network resources) when identifying control accounts that correspond to accounts that were exposed to an event associated with a merchant as compared to a process that involves only comparing one or more fields of a historical transaction profile of an individual to one or more fields of a historical transaction profile of another individual.

Referring now to FIG. 1, FIG. 1 is a diagram of an example environment 100 in which devices, systems, and/or methods, described herein, may be implemented. As shown in FIG. 1, environment 100 includes transaction service provider system 102, issuer system 104, user device 106, merchant system 108, acquirer system 110, and communication network 112.

Transaction service provider system 102 may include one or more devices capable of receiving information from and/or communicating information to issuer system 104, user device 106, merchant system 108, and/or acquirer system 110 via communication network 112. For example, transaction service provider system 102 may include a device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to the transaction service provider system 102. In some non-limiting embodiments, transaction service provider system 102 may be capable of receiving information from, storing information in, communicating information to, or searching information stored in a data storage device.

Issuer system 104 may include one or more devices capable of receiving information and/or communicating information to transaction service provider system 102, user device 106, merchant system 108, and/or acquirer system 110 via communication network 112. For example, issuer system 104 may include a device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with user device 106.

User device 106 may include one or more devices capable of receiving information from and/or communicating information to transaction service provider system 102, issuer system 104, merchant system 108, and/or acquirer system 110 via communication network 112. For example, user device 106 may include a client device and/or the like. In some non-limiting embodiments, user device 106 may or may not be capable of receiving information (e.g., from merchant system 108) via a short range wireless communication connection (e.g., an NFC communication connection, an RFID communication connection, a Bluetooth® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, user device 106, and/or acquirer system 110 via communication network 112. Merchant system 108 may also include a device capable of receiving information from user device 106 via communication network 112, a communication connection (e.g., an NFC communication connection, an RFID communication connection, a Bluetooth® communication connection, and/or the like) with user device 106, and/or the like, and/or communicating information to user device 106 via the network, the communication connection, and/or the like. In some non-limiting embodiments, merchant system 108 may include a device, such as a server, a group of servers, a client device, a group of client devices, and/or other like devices. In some non-limiting embodiments, merchant system 108 may be associated with a merchant as described herein. In some non-limiting embodiments, merchant system 108 may include one or more user devices 106. For example, merchant system 108 may include user device 106 that allows a merchant to communicate information to transaction service provider system 102. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, user device 106, and/or merchant system 108 via communication network 112. For example, acquirer system 110 may include a device, a server, a group of servers, and/or the like. In some non-limiting embodiments, acquirer system 110 may be associated with an acquirer as described herein.

Communication network 112 may include one or more wired and/or wireless networks. For example, communication network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices, systems, and/or networks, fewer devices, systems, and/or networks, different devices, systems, and/or networks, or differently arranged devices, systems, and/or networks than those shown in FIG. 1. Furthermore, two or more devices or systems shown in FIG. 1 may be implemented within a single device or a single system, or a single device or a single system shown in FIG. 1 may be implemented as multiple, distributed devices or multiple, distributed systems. Additionally or alternatively, a set of devices or systems (e.g., one or more devices or systems) of environment 100 may perform one or more functions described as being performed by another set of devices or systems of environment 100.

Figure 2:
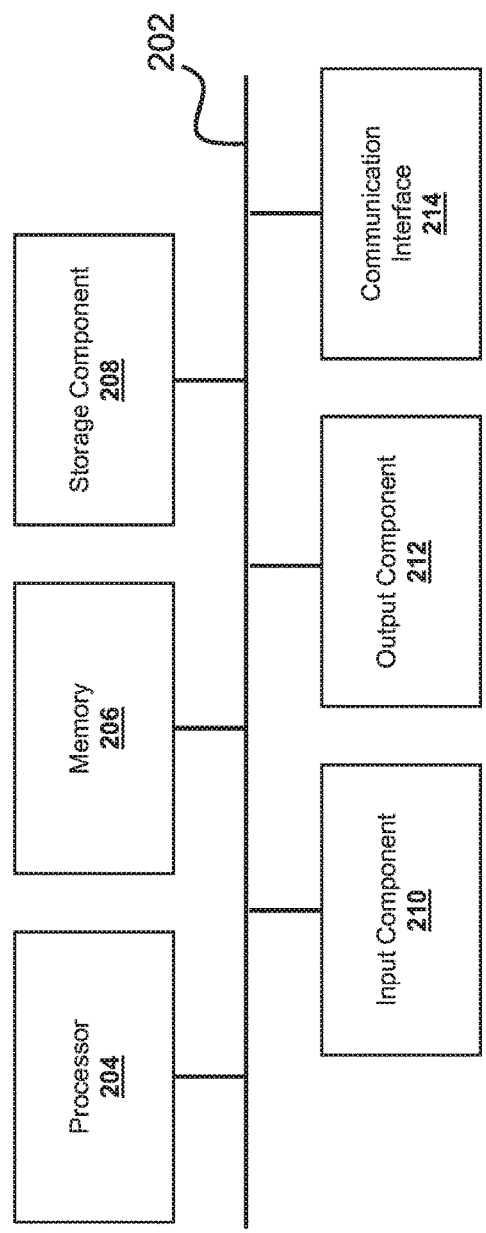
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, and/or one or more devices of issuer system 104, user device 106, one or more devices of merchant system 108, and/or one or more devices of acquirer system 110. In some non-limiting embodiments, transaction service provider system 102, issuer system 104, user device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
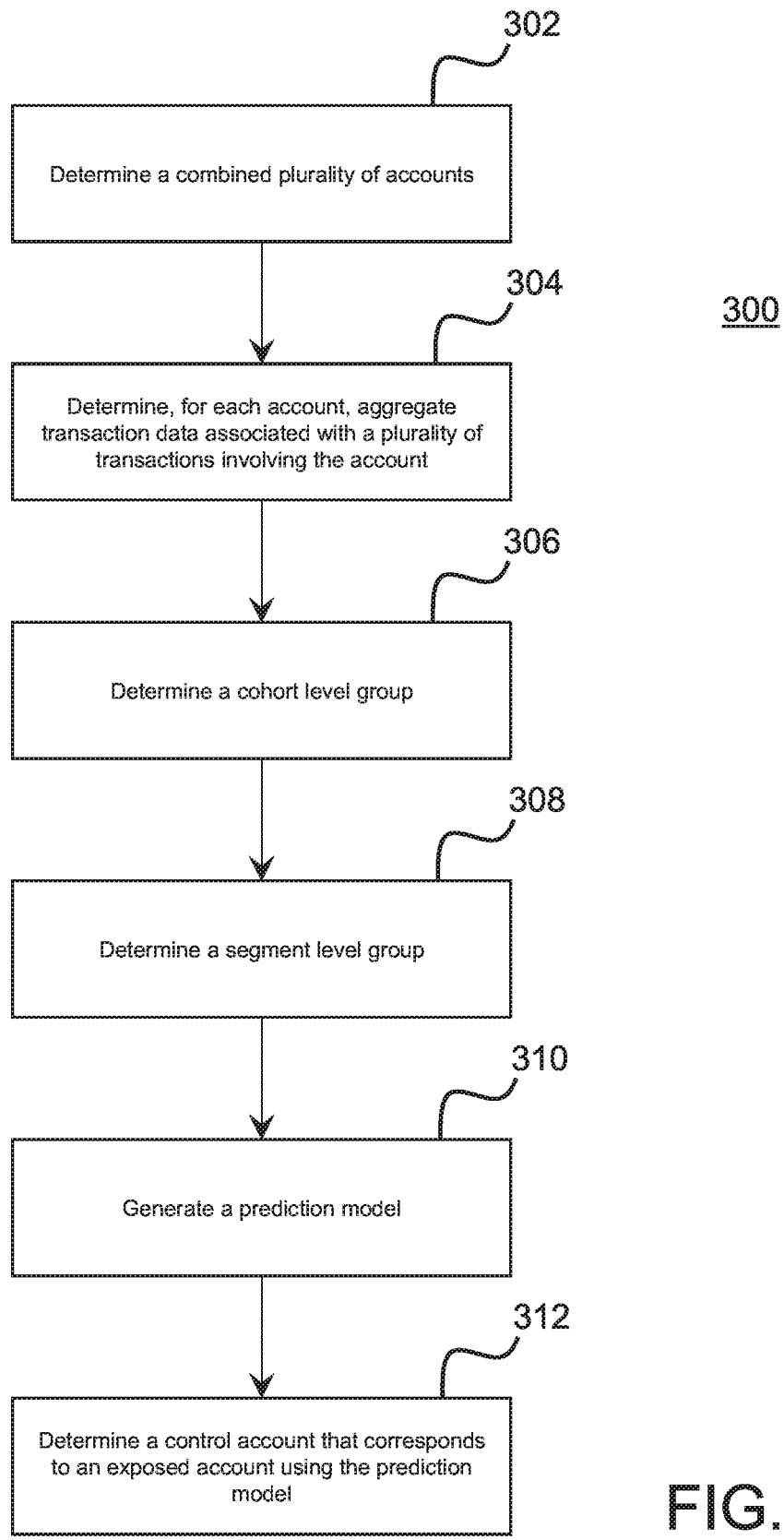
FIG. 3 is a flowchart illustrating a non-limiting embodiment of a method for determining a control account that corresponds to an exposed account.

Referring now to FIG. 3, FIG. 3 is a flowchart of a non-limiting embodiment of a process 300 for determining a control account that corresponds to an exposed account. In some non-limiting embodiments, one or more of the steps of process 300 may be performed (e.g., completely, partially, etc.) by transaction service provider system 102 (e.g., one or more devices of transaction service provider system 102). In some non-limiting embodiments, one or more of the steps of process 300 may be performed (e.g., completely, partially, etc.) by another device or a group of devices separate from or including transaction service provider system 102, such as issuer system 104 (e.g., one or more devices of issuer system 104), user device 106, merchant system 108 (e.g., one or more devices of merchant system 108), or acquirer system 110 (e.g., one or more devices of acquirer system 110).

As shown in FIG. 3, at step 302, process 300 may include determining a combined plurality of accounts. For example, transaction service provider system 102 may determine a combined plurality of accounts. In some non-limiting embodiments or aspects, transaction service provider system 102 may determine a combined plurality of accounts including a plurality of exposed accounts and a plurality of control accounts. For example, transaction service provider system 102 may determine a combined plurality of accounts including a plurality of exposed accounts and a plurality of control accounts based on transaction service provider system 102 combining the plurality of exposed accounts and the plurality of control accounts. In such an example, transaction service provider system 102 may determine the combined plurality of accounts including each account of the plurality of exposed accounts and each account of the plurality of control accounts based on transaction service provider system 102 combining each of the plurality of exposed accounts and each of the plurality of control accounts. In some non-limiting embodiments or aspects, transaction service provider system 102 may create the account pool table, described below. For example, transaction service provider system 102 may create the account pool table, where the account pool table includes each account of a combined plurality of accounts. In such an example, the combined plurality of accounts may include a plurality of control accounts and a plurality of exposed accounts.

In some non-limiting embodiments or aspects, transaction service provider system 102 may determine a plurality of exposed accounts. For example, transaction service provider system 102 may determine a plurality of exposed accounts where the plurality of exposed accounts include one or more groups (e.g., sets, pools, bundles, and/or the like) of accounts. In some non-limiting embodiments or aspects, the plurality of exposed accounts (e.g., one or more groups of accounts of the plurality of exposed accounts) may be defined based on a time period associated with an event, such as a time period in which each account (e.g., each account of a group) was exposed to an event involving a merchant. In some non-limiting embodiments or aspects, an event may be associated with a time period in which one or more accounts were exposed to the event involving the merchant, such as a time period during which the one or more accounts were provided an offer for redemption from the merchant. In some non-limiting embodiments or aspects, transaction service provider system 102 may create a table of exposed accounts that includes one or more groups of accounts of a plurality of exposed accounts.

In some non-limiting embodiments or aspects, transaction service provider system 102 may determine a plurality of control accounts (e.g., a plurality of individual accounts, a group of accounts, a plurality of groups of accounts, and/or the like). For example, transaction service provider system 102 may determine a plurality of control accounts where the plurality of control accounts include one or more groups of accounts. In some non-limiting embodiments or aspects, each account of the plurality of control accounts may have been involved in at least one transaction involving a merchant (e.g., a merchant associated with an event, such as a merchant that provides an offer for redemption) during one or more event time periods. In some non-limiting embodiments or aspects, transaction service provider system 102 may create a table of control accounts that includes one or more groups of accounts of a plurality of control accounts.

In some non-limiting embodiments or aspects, transaction service provider system 102 may determine the combined plurality of accounts based on transaction service provider system 102 combining a table of exposed accounts and a table of control accounts. In some non-limiting embodiments or aspects, transaction service provider system 102 may create the account pool table based on the table of exposed accounts and the table of control accounts. For example, transaction service provider system 102 may create the account pool table based on transaction service provider system 102 combining one or more accounts included in the table of exposed accounts and one or more accounts included in the table of control accounts.

In some non-limiting embodiments, transaction service provider system 102 may determine a distance to a merchant location of a merchant (e.g., a merchant associated with an event) that is closest to an account (e.g., an address associated with an account) for each account in the account pool table. In some non-limiting embodiments, the distance may include a distance between a zip code of the account of a customer and a zip code of the merchant location that is closest to the account of the customer. In some non-limiting embodiments or aspects, transaction service provider system 102 may create an account pool table based on transaction service provider system 102 determining one or more distances to one or more merchant locations that are closest to an account for each account in the account pool table and/or for each account in a plurality of groups of accounts.

In some non-limiting embodiments or aspects, transaction service provider system 102 may perform a check for each account of the account pool table and/or for each account of the plurality of groups of accounts (e.g., each account of the combined plurality of accounts). For example, transaction service provider system 102 may perform a check based on the distance between a merchant location of the merchant and a zip code of an account of a customer of each account of the account pool table and/or for accounts of the plurality of groups of accounts. For example, transaction service provider system 102 may perform a check account of the account pool table and/or for accounts of the plurality of groups of accounts based on transaction service provider system 102 comparing the distance between the merchant location of the merchant and the zip code of the account of a customer of each account to a threshold value of distance. In such an example, the threshold value of distance may be associated with a distance according to which one or more events are determined to be effective (e.g., to cause a customer of an account to initiate a transaction in accordance with the event). In some non-limiting embodiments or aspects, where the distance between the merchant location of the merchant and the zip code of the account of a customer of each account satisfies the threshold value of distance, transaction service provider system 102 may include the account in the combined plurality of accounts. Additionally, or alternatively, where the distance between the merchant location of the merchant and the zip code of the account of a customer of each account does not satisfy the threshold value of distance, transaction service provider system 102 may forego including the account in the combined plurality of accounts.

As shown in FIG. 3, at step 304, process 300 may include determining, for each account, aggregate transaction data associated with a plurality of transactions involving the account. For example, transaction service provider system 102 may determine, for each account, aggregate transaction data associated with a plurality of transactions involving the account. In such an example, transaction service provider system 102 may determine the aggregate transaction data associated with a plurality of transactions involving the account, where each transaction involves an account of the combined plurality of accounts. In some non-limiting embodiments or aspects, each transaction of the plurality of transactions may be associated with (e.g., conducted during) an event time period. In some non-limiting embodiments or aspects, each transaction of the plurality of transactions may include data associated with a plurality of transaction variables. For example, data associated with each transaction of the plurality of transactions may include data associated with a plurality of transaction variables.

In some non-limiting embodiments or aspects, transaction service provider system 102 may create a monthly aggregate transaction data table. For example, transaction service provider system 102 may create a monthly aggregate transaction data table for each account of the combined plurality of accounts. In some non-limiting embodiments or aspects, transaction service provider system 102 may create the monthly aggregate transaction data table for each account of the combined plurality of accounts based on transaction service provider system 102 generating the aggregate transaction data associated with the plurality of transactions. For example, transaction service provider system 102 may create the monthly aggregate transaction data table for each account of the combined plurality of accounts based on transaction service provider system 102 retrieving data associated with one or more transactions from a database to create the aggregate transaction data table. In some non-limiting embodiments or aspects, transaction service provider system 102 may determine an initial specified event time period. For example, transaction service provider system 102 may determine an initial specified event time period that is a first specified event time period of a plurality of event time periods. Additionally, or alternatively, transaction service provider system 102 may determine the initial specified event time period that is a second specified event time period of a plurality of event time periods, where the second specified event time period is a time period that is after the initial specified event time period. In some non-limiting embodiments or aspects, transaction service provider system 102 may determine a final specified event time period. For example, transaction service provider system 102 may determine a final specified event time period that is a final specified event time period (e.g., the most recent specified event time period) of the plurality of specified event time periods.

In some non-limiting embodiments or aspects, transaction service provider system 102 may determine aggregate transaction data associated with a plurality of transactions during a time interval (e.g., a plurality of time periods). For example, transaction service provider system 102 may determine aggregate transaction data associated with a plurality of transactions during a time interval that is associated with an initial specified event time period and a final specified event time period. In such an example, transaction service provider system 102 may determine the aggregate transaction data associated with a plurality of transactions during the time interval that is associated with the initial specified event time period and the final specified event time period, where each transaction of the plurality of transactions is associated with (e.g., corresponds to, involves, is conducted using, and/or the like) an account (e.g., an account of the combined plurality of accounts). In some non-limiting embodiments or aspects, transaction service provider system 102 may determine the aggregate transaction data associated with a plurality of transactions during a time interval for a plurality of accounts. For example, transaction service provider system 102 may determine the aggregate transaction data associated with the plurality of transactions during a time interval for a plurality of accounts of the combined plurality of accounts. In an example, transaction service provider system 102 may determine aggregate transaction data associated with the plurality of transactions during a time interval starting fifteen months prior to an initial specified event time period and ending six months after a final specified event time period for each account of the combined plurality of accounts.

As further shown in FIG. 3, at step 306, process 300 may include determining a cohort level group. For example, transaction service provider system 102 may determine a cohort level group (e.g., a cohort level group of accounts). In some non-limiting embodiments or aspects, transaction service provider system 102 may determine one or more cohort level groups (e.g., a plurality of cohort level groups, a predetermined number of cohort level groups, and/or the like). In some non-limiting embodiments or aspects, transaction service provider system 102 may determine the first cohort level group based on a specified event time period. For example, transaction service provider system 102 may determine the first cohort level group where the first cohort level group includes accounts that were exposed to an event associated with a merchant during the specified time period. In such an example, the first cohort level group includes accounts that were exposed to an event associated with a merchant during the specified time period during which accounts of the combined plurality of accounts enrolled in a loyalty program.

In some non-limiting embodiments or aspects, transaction service provider system 102 may create a cohort level table. In some non-limiting embodiments, transaction service provider system 102 may create the cohort level table based on one or more cohort groups of accounts. For example, transaction service provider system 102 may create the cohort level table based on one or more cohort groups of accounts, where each first cohort level group includes a plurality of accounts that are included in one or more of the cohort groups of accounts.

In some non-limiting embodiments or aspects, transaction service provider system 102 may determine cohort aggregate data associated with one or more cohort groups of accounts. For example, transaction service provider system 102 may determine cohort aggregate data associated with one or more cohort groups of accounts, where the cohort aggregate data for each of the one or more cohort groups of accounts includes cohort aggregate transaction data associated with a plurality of transactions. In such an example, the cohort aggregate transaction data may include aggregate transaction data associated with a plurality of transactions during a specified event time period, the plurality of transactions also being associated with (e.g., corresponds to, conducted by, and/or the like) one or more accounts (e.g., one or more control accounts and/or one or more exposed accounts) included with the one or more cohort groups of accounts. In some non-limiting embodiments or aspects, transaction service provider system 102 may determine the cohort aggregate transaction data associated with each first cohort level group (e.g., each first cohort level group of a plurality of cohort level groups of accounts). In some non-limiting embodiments or aspects, transaction service provider system 102 may determine (e.g., select) the aggregate transaction data associated with the plurality of transactions during the specified event time period that is associated with the one or more cohort groups of accounts based on (e.g., from) the aggregate transaction data associated with a plurality of transactions based on (e.g., during) a time interval. In some non-limiting embodiments or aspects, transaction service provider system 102 may determine the cohort aggregate transaction data associated with the plurality of transactions during the specified event time period that is associated with a first cohort level group based on (e.g., from) the aggregate transaction data associated with a plurality of transactions based on (e.g., during) the event time period for each account of the combined plurality of accounts.

In some non-limiting embodiments or aspects, transaction service provider system 102 may create a cohort monthly aggregate table. For example, transaction service provider system 102 may create a cohort monthly aggregate table for each cohort level group (e.g., a first cohort level group of a plurality of cohort groups of accounts). In such an example, the cohort monthly aggregate table may include aggregate transaction data associated with a plurality of transactions during the specified event time period that is associated with a cohort level group (e.g., the first cohort level group).

In some non-limiting embodiments, transaction service provider system 102 may identify each account of a cohort level group (e.g., a first cohort level group) as either an existing customer or a new customer for a specified merchant. For example, transaction service provider system 102 may identify each account of a cohort level group (e.g., a first cohort level group) as being associated with an existing customer or as being associated with a new customer. In some non-limiting embodiments or aspects, transaction service provider system 102 may identify each account of the cohort level group (e.g., the first cohort level group) as being associated with an existing customer or as being associated with a new customer based on an indication (e.g., a flag) of whether the account has conducted a transaction with a merchant. Additionally, or alternatively, transaction service provider system 102 may identify each account of the cohort level group (e.g., the first cohort level group) as either an existing customer or a new customer based on an indication of whether the account has conducted a transaction with a merchant within a time period prior to the specific event time period associated with a cohort level group (e.g., a first cohort level group). Where an indication is present (e.g., a flag is set to true), transaction service provider system 102 may identify the account as being associated with an existing customer. Additionally, or alternatively, where an indication is not present (e.g., a flag is set to false), transaction service provider system 102 may identify the account as not being associated with an existing customer. In some non-limiting embodiments or aspects, an account associated with an existing customer may include an account that was involved in a transaction with a merchant within a time period prior to the specific event time period associated with a cohort level group of accounts. In some non-limiting embodiments or aspects, an account associated with a new customer may include an account that was not involved in a transaction with the merchant within a time period prior to the specific event time period associated with a cohort level group of accounts. Additionally or alternatively, the account associated with a new customer may include an account that was involved in a transaction with the merchant during the specific event time period associated with the cohort level group of accounts.

In some non-limiting embodiments or aspects, transaction service provider system 102 may determine a sample of control accounts from the combined plurality of accounts. For example, transaction service provider system 102 may determine a sample of control accounts from the combined plurality of accounts based on at least one random number (e.g., a random number, a plurality of random numbers, a plurality of random numbers within a range of random numbers, a plurality of random numbers within a plurality of ranges of random numbers, and/or the like). Additionally, or alternatively, transaction service provider system 102 may determine the sample of control accounts from the first cohort level group based on at least one random number (e.g., a random number, a plurality of random numbers, a plurality of random numbers within a range of random numbers, a plurality of random numbers within a plurality of ranges of random numbers, and/or the like) included in the cohort monthly aggregate table for the first cohort level group. Additionally, or alternatively, transaction service provider system 102 may determine the sample of control accounts from a first cohort level group based on at least one random number (e.g., a random number, a plurality of random numbers, a plurality of random numbers within a range of random numbers, a plurality of random numbers within a plurality of ranges of random numbers, and/or the like) included in each cohort monthly aggregate table for each cohort level group (e.g., a_first cohort level group).

In some non-limiting embodiments or aspects, transaction service provider system 102 may determine a plurality of modeling variables for accounts of the combined plurality of accounts. For example, transaction service provider system 102 may determine a plurality of modeling variables for accounts of the combined plurality of accounts. Additionally, or alternatively, transaction service provider system 102 may determine the plurality of modeling variables for accounts of the plurality of control accounts and accounts of the plurality of exposed accounts. Additionally, or alternatively, transaction service provider system 102 may determine the plurality of modeling variables for accounts of the plurality of control accounts and accounts of the plurality of exposed accounts in a cohort level group (e.g., a first cohort level group). In some non-limiting embodiments or aspects, modeling variables may include one or more of a spending amount (e.g., a measure of funds transferred during one or more transactions) of a range of spending amounts (e.g., a low spending range, a middle spending range, an upper spending range, and/or the like), a number of transactions initiated using an account of a customer that involve a merchant during a time period (e.g., two transactions, three transactions, five transactions, and/or the like), a total transaction amount of transactions initiated using an account of a customer that involve a merchant during a time period, a number of transactions initiated using an account of a customer that involve a merchant during a time period that is prior to a time period (e.g., before an event time period), a number of transactions initiated using an account of a customer that involve a merchant during a time period that is after a time period (e.g., after an event time period), a total transaction amount of transactions initiated using an account of a customer that involve a merchant during a time period that is prior to a time period, a total transaction amount of transactions initiated using an account of a customer that involve a merchant during a time period that is after a time period involving a merchant initiated, a merchant category of a merchant involved in a transaction (e.g., a merchant category code), an amount spent at a merchant during a time period (e.g., an amount spent at a merchant during week, during a month, and/or the like), an indication of whether a transaction was initiated using a credit and/or a debit account of a customer that involves a merchant, an average transaction amount of a transaction initiated using an account of a customer that involves a merchant during a time period, a percentage of spending associated with a category according to a merchant category, and/or the like.

In some non-limiting embodiments or aspects, transaction service provider system 102 may create a modeling table. For example, transaction service provider system 102 may create a modeling table based on a sample of control accounts associated with (e.g., included in) the monthly aggregate transaction data table. In some non-limiting embodiments or aspects, the modeling table may include a plurality of modeling variables and/or an indication of whether each account is part of a validation segment of accounts.

As shown in FIG. 3, at step 308, process 300 includes determining a segment level group. For example, transaction service provider system 102 may determine a segment level group. In some non-limiting embodiments or aspects, transaction service provider system 102 may determine a plurality of segment level groups. In some non-limiting embodiments or aspects, transaction service provider system 102 may determine one or more segment level groups (e.g., a plurality of segment level groups, a predetermined number of segment level groups, and/or the like). In some non-limiting embodiments or aspects, transaction service provider system 102 may determine the first segment level group from a cohort level group (e.g., a first cohort level group). For example, transaction service provider system 102 may determine the first segment level group of accounts from each cohort level group.

In some non-limiting embodiments or aspects, transaction service provider system 102 may determine a segment level group (e.g., a first segment level group) of accounts from the cohort level group of accounts based on whether the account is part of a validation segment of accounts or post-event segment of accounts and whether the account is an existing account or a new account. For example, transaction service provider system 102 may determine a segment level group (e.g., first segment level group of accounts from the cohort level group of accounts based on an indication of whether the account is part of a validation segment of accounts or post-event segment of accounts and an indication of whether the account is an existing account or a new account. In some non-limiting embodiments or aspects, transaction service provider system 102 may determine a subset of accounts from each cohort level group based on an indication of whether the account is part of a validation segment of accounts. In some non-limiting embodiments or aspects, transaction service provider system 102 may determine that an account may not be part of a validation segment of accounts for a cohort level group based on transaction service provider system 102 determining that the indication of whether the account is part of the validation segment of accounts is not present. Additionally, or alternatively, transaction service provider system 102 may determine that an account may be part of the validation segment of accounts for a cohort level group based on transaction service provider system 102 determining that the indication of whether the account is part of a validation segment of accounts is present. In some non-limiting embodiments or aspects, transaction service provider system 102 may determine a subset of accounts from each cohort level group based on an indication of whether the account is part of a post-event segment of accounts. In some non-limiting embodiments or aspects, transaction service provider system 102 may determine that an account may not be part of a post-event segment of accounts for a cohort level group based on transaction service provider system 102 determining that the indication of whether the account is part of the post-event segment of accounts is not present. Additionally, or alternatively, transaction service provider system 102 may determine that an account may be part of the post-event segment of accounts for a cohort level group based on transaction service provider system 102 determining that the indication of whether the account is part of a post-event segment of accounts is present.

In some non-limiting embodiments or aspects, transaction service provider system 102 may identify each account of the cohort level group. For example, transaction service provider system 102 may identify each account of the cohort level group based on whether the account is associated with an existing customer or a new customer. In some non-limiting embodiments or aspects, transaction service provider system 102 may identify each account of the cohort level group based on an indication of whether the account is associated with an existing customer or a new customer. In some non-limiting embodiments or aspects, transaction service provider system 102 may determine that an account may be associated with an existing customer based on transaction service provider system 102 determining that the indication of whether the account is associated with an existing customer is present. Additionally, or alternatively, transaction service provider system 102 may determine that an account may be associated with a new customer based on transaction service provider system 102 determining that the indication of whether the account is associated with a new customer is present. In some non-limiting embodiments or aspects, each cohort level group may include one or more subsets of accounts. For example, each cohort level group may include four subsets of accounts. In such an example, the four subsets of accounts may include a first subset for a validation and existing segment of accounts, a second subset for a validation and new segment of accounts, a third subset for a non-validation and existing segment of accounts, and a fourth subset for a non-validation and new segment of accounts.

As shown in FIG. 3, at step 310, process 300 includes generating a prediction model. For example, transaction service provider system 102 may generate a prediction model. In some non-limiting embodiments or aspects, transaction service provider system 102 may generate the prediction model based on one or more control accounts. For example, transaction service provider system 102 may generate the prediction model based on a sample of control accounts. In some non-limiting embodiments or aspects, transaction service provider system 102 may generate the prediction model based on a plurality of control accounts. For example, transaction service provider system 102 may generate the prediction model based on a plurality of control accounts in a cohort level group.

In some non-limiting embodiments or aspects, transaction service provider system 102 may generate a prediction model based on a plurality of modeling variables. For example, transaction service provider system 102 may generate a prediction model based on a plurality of modeling variables for control accounts. In such an example, transaction service provider system 102 may generate the prediction model based on the plurality of modeling variables for the control accounts, where the control accounts are included in a cohort level group. In some non-limiting embodiments or aspects, the plurality of modeling variables may be included in a modeling table.

In some non-limiting embodiments or aspects, transaction service provider system 102 may generate a prediction model by training a model based on a subset of a plurality of modeling variables. For example, transaction service provider system 102 may generate a prediction model by training a model based on a subset of a plurality of modeling variables and/or a small number (e.g., 3, 4, or 5) of randomly shuffled variables when transaction service provider system 102 trains the prediction model. In some non-limiting embodiments or aspects, transaction service provider system 102 may determine variable importance when transaction service provider system 102 trains the prediction model. In some non-limiting embodiments or aspects, transaction service provider system 102 may determine that one or more variables have a lowest variable importance (e.g., are determined to be less important that one or more other variables). For example, transaction service provider system 102 may determine that one or more variables have a lowest variable importance and transaction service provider system 102 may exclude the one or more variables having the lowest variable importance. In some non-limiting embodiments or aspects, transaction service provider system 102 may train, validate, and test the prediction model. For example, transaction service provider system 102 may train, validate, and test the prediction model based on variables that do not include the one or more variables having a lowest variable importance.

In some non-limiting embodiments or aspects, transaction service provider system 102 may calculate an error term. For example, transaction service provider system 102 may calculate an error term based on (e.g., as part of) training a prediction model. In some non-limiting embodiments or aspects, transaction service provider system 102 may update weights of the prediction model. For example, transaction service provider system 102 may update weights of the prediction model based on the error term. In some non-limiting embodiments or aspects, transaction service provider system 102 may calculate the error term based on transaction service provider system 102 calculating a mean squared error, a sum of actuals, a sum of predictions, an estimated lift, and/or out of bag R^2 variables. For example, transaction service provider system 102 may calculate the error term based on transaction service provider system 102 calculating a mean squared error, a sum of actuals, a sum of predictions, an estimated lift, and/or out of bag R^2 variables and transaction service provider system 102 may update weights of the prediction model based on the error term.

In some non-limiting embodiments or aspects, transaction service provider system 102 may generate a prediction score. For example, transaction service provider system 102 may generate a prediction score for one or more control accounts. In such an example, transaction service provider system 102 may generate the prediction score for each control account of a plurality of control accounts. In some non-limiting embodiments or aspects, transaction service provider system 102 may generate the prediction score for each control account in a segment level group of accounts. For example, transaction service provider system 102 may generate the prediction score for each control account in each segment level group of accounts in a cohort level group. In some non-limiting embodiments or aspects, a prediction score may represent an amount of spending involving an account after the specified event time period associated with a cohort group. For example, a prediction score may represent an amount of spending involving an account such as, for example, a control account for which aggregate transaction data associated with the control account was used as input to the prediction model. Additionally, or alternatively, a prediction score may represent the amount of spending involving the account such as an exposed account for which aggregate transaction data associated with the exposed account was used as input to the prediction model. In some non-limiting embodiments or aspects, transaction service provider system 102 may add noise to a prediction score of a control account included in a segment level group of accounts.

In some non-limiting embodiments or aspects, transaction service provider system 102 may generate a prediction score for one or more exposed accounts. For example, transaction service provider system 102 may generate a prediction score for each exposed account of a plurality of exposed accounts. In some non-limiting embodiments or aspects, transaction service provider system 102 may generate the prediction score for each exposed account in a segment level group of accounts. For example, transaction service provider system 102 may generate the prediction score for each exposed account in a segment level group of accounts of a cohort level group.

As shown in FIG. 3, at step 312, process 300 includes determining a control account that corresponds to an exposed account using the prediction model. For example, transaction service provider system 102 may determine a control account that corresponds to an exposed account using the prediction model. In some non-limiting embodiments or aspects, transaction service provider system 102 may determine a plurality of control accounts that correspond to an exposed account. For example, transaction service provider system 102 may determine a plurality of control accounts that correspond to an exposed account based on a prediction score for the control account and a prediction score for the exposed account. In some non-limiting embodiments or aspects, transaction service provider system 102 may determine a plurality of prediction scores for a first plurality of control accounts. Additionally, or alternatively, transaction service provider system 102 may determine a second plurality of control accounts that have a prediction score that is equal to a prediction score of an exposed account. Additionally, or alternatively, transaction service provider system 102 may determine a second plurality of control accounts that have a prediction score that is equal to a prediction score that is within a threshold of the prediction score of the exposed account. In some non-limiting embodiments or aspects, transaction service provider system 102 may determine the second plurality of control accounts that have the prediction score that is equal to the prediction score that is within the threshold of the prediction score of the exposed account based on transaction service provider system 102 adding noise to the prediction score of a control account included in a segment level group of accounts.

In some non-limiting embodiments or aspects, transaction service provider system 102 may generate a plurality of clusters of control accounts. For example, transaction service provider system 102 may generate a plurality of clusters of control accounts for the second plurality of control accounts. In some non-limiting embodiments or aspects, transaction service provider system 102 may generate the plurality of clusters using a K-means clustering algorithm. In some non-limiting embodiments or aspects, each cluster may include one exposed account. In some non-limiting embodiments or aspects, transaction service provider system 102 may generate the plurality of clusters of control accounts based on modeling variables that represent aggregate transaction data associated with the second plurality of accounts. For example, transaction service provider system 102 may generate the plurality of clusters of control accounts based on modeling variables that represent aggregate transaction data associated with the second plurality of accounts, where the modeling variables are modeling variables based on activities prior to the specified event time period.

In some non-limiting embodiments or aspects, transaction service provider system 102 may determine one or more control accounts of each cluster of control accounts. For example, transaction service provider system 102 may determine one or more control accounts of each cluster of control accounts that correspond to the exposed account of the cluster. In such an example, transaction service provider system 102 may determine the one or more control accounts of each cluster of control accounts that correspond to the exposed account of the cluster using a K-nearest neighbor algorithm. In some non-limiting embodiments or aspects, transaction service provider system 102 may determine a propensity score for between each control account of the cluster of control accounts and the exposed account. For example, transaction service provider system 102 may determine a propensity score for between each control account of the cluster of control accounts and the exposed account using the K-nearest neighbor algorithm. In some non-limiting embodiments or aspects, transaction service provider system 102 may determine a propensity score for between each control account of the cluster of control accounts and the exposed account based on modeling variables that represent aggregate transaction data associated with the second plurality of accounts. For example, transaction service provider system 102 may determine a propensity score for between each control account of the cluster of control accounts and the exposed account based on modeling variables that represent aggregate transaction data associated with the second plurality of accounts, where the modeling variables are modeling variables based on activities prior to the specified event time period (e.g., modeling variables such as spending amount (e.g., a measure of funds transferred during one or more transactions)) of a range of spending amounts (e.g., a low spending range, a middle spending range, an upper spending range, and/or the like), a number of transactions initiated using an account of a customer that involve a merchant during a time period (e.g., two transactions, three transactions, five transactions, and/or the like), a total transaction amount of transactions initiated using an account of a customer that involve a merchant during a time period, a number of transactions initiated using an account of a customer that involve a merchant during a time period that is prior to a time period (e.g., an event time period), a total transaction amount of transactions initiated using an account of a customer that involve a merchant during a time period that is prior to a time period, a merchant category of a merchant involved in a transaction (e.g., a merchant category code), an amount spent at a merchant during a time period (e.g., an amount spent at a merchant during week, during a month, and/or the like), an indication of whether a transaction was initiated using a credit and/or a debit account of a customer that involves a merchant, an average transaction amount of a transaction initiated using an account of a customer that involves a merchant during a time period, a percentage of spending associated with a category according to a merchant category, and/or the like.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the present disclosure. For example, it is to be understood that the present disclosure contemplates that, to the extent possible, one or more features of any embodiment can be combined with one or more features of any other embodiment.

What is claimed is:

1. A system, comprising:
at least one processor programmed or configured to:
determine a combined plurality of accounts, wherein, when determining the combined plurality of accounts, the at least one processor is programmed or configured to:
determine a plurality of exposed accounts, wherein each account of the plurality of exposed accounts is associated with an event time period of a plurality of event time periods, wherein each event time period of the plurality of event time periods is associated with a time period during which the account was exposed to an event associated with a merchant, wherein the event associated with the merchant is an offer associated with a loyalty program of the merchant or enrollment in the loyalty program of the merchant, and
determine a plurality of control accounts, wherein each account of the plurality of control accounts conducted at least one transaction involving the merchant during at least one event time period of the plurality of event time periods;
determine, for each account of the combined plurality of accounts, aggregate transaction data associated with a plurality of transactions involving each account during a time interval;
determine a first cohort level group of accounts, wherein the first cohort level group of accounts comprises a group of exposed accounts and a group of control accounts that are associated with a first specified event time period of the plurality of event time periods;
determine a first segment level group of accounts from the first cohort level group of accounts based on an indication of whether the account is part of a validation segment of accounts or post-event segment of accounts and an indication of whether the account is an existing account or a new account;
generate a prediction model based on a plurality of control accounts that are included in the first segment level group of accounts, wherein the prediction model is configured to output a prediction score that represents an amount of spending involving an account after the first specified event time period, wherein, when generating the prediction model, the at least one processor is programmed or configured to:
determine a plurality of modeling variables for each account of the group of control accounts included in the first cohort level group of accounts, wherein the plurality of modeling variables comprises:
a number of transactions initiated using the account that involve the merchant during the first specified event time period;
a number of transactions initiated using the account that involve the merchant during a time period that is before the first specified event time period;
a number of transactions initiated using the account that involve the merchant during a time period that is after the first specified event time period;
determine a variable importance metric associated with each modeling variable of the plurality of modeling variables;
exclude one or more modeling variables of the plurality of modeling variables based on the variable importance metric associated with the one or more modeling variables of the plurality of modeling variables to provide a subset of modeling variables;
train the prediction model based on the subset of modeling variables:
calculate an error term based on training the prediction model; and
update one or more weights of the prediction model based on the error term;
identify a first exposed account of a plurality of exposed accounts that are included in the first segment level group of accounts;
determine a first control account of the plurality of control accounts that are included in the first segment level group of accounts that corresponds to the first exposed account using the prediction model; and
output a report comprising data associated with the first control account that corresponds to the first exposed account.

2. The system of claim 1, wherein the group of exposed accounts comprises a group of accounts that were exposed to a first event associated with the merchant during the first specified event time period, and wherein the group of control accounts comprises a group of accounts that conducted at least one transaction involving the merchant during the first specified event time period.

3. The system of claim 1, wherein when determining the combined plurality of accounts, the at least one processor is programmed or configured to:
determine, for each account of a plurality of accounts, a distance between a merchant location of the merchant associated with the event and an address associated with an account;
determine that the distance between the merchant location of the merchant associated with the event and the address associated with the account of the plurality of accounts satisfies a threshold value of distance; and
include the account in the combined plurality of accounts based on determining that the distance between the merchant location of the merchant associated with the event and the address associated with the account satisfies the threshold value of distance.

4. The system of claim 1, wherein when determining, for each account of the combined plurality of accounts, aggregate transaction data associated with the plurality of transactions involving each account during the time interval, the at least one processor is programmed or configured to:
create an aggregate transaction data table that includes aggregate transaction data associated with the plurality of transactions during each event time period of a plurality of event time periods involving each account of the combined plurality of accounts;

determine an initial event time period of the plurality of event time periods, wherein the initial event time period is a beginning of the time interval;

determine a final event time period of the plurality of event time periods, wherein the final event time period is an end of the time interval; and determine, for each account of the combined plurality of accounts, aggregate transaction data associated with the plurality of transactions involving each account during the time interval based on aggregate transaction data associated with the plurality of transactions involving each account between the initial specified event time period and the final specified event time period.

5. The system of claim 1, wherein the at least one processor is further programmed or configured to:

determine cohort aggregate transaction data for each account of the first cohort level group, wherein the cohort aggregate transaction data includes aggregate transaction data associated with the plurality of transactions, which involve each account included in the group of exposed accounts and control accounts that are associated with the first specified event time period, during the first specified event time period associated with the first cohort level group.

6. The system of claim 1, wherein the at least one processor is further programmed or configured to:

identify each account of the first cohort level group as being associated with an existing customer or as being associated with a new customer.

7. The system of claim 1, wherein when determining the first segment level group of accounts from the first cohort level group of accounts, the at least one processor is programmed or configured to:

determine the first segment level group of accounts from the first cohort level group of accounts based on the indication that the account is part of the post-event segment of accounts and the indication that the account is an existing account; and wherein when generating the prediction model based on the plurality of control accounts that are included in the first segment level group of accounts, the at least one processor is programmed or configured to:

generate the prediction model based on the plurality of control accounts that are part of the post-event segment of accounts and that are existing accounts.

8. A computer program product, the computer program product comprising at least one non-transitory computer-readable medium including one or more instructions that, when executed by at least one processor, cause the at least one processor to:

determine a combined plurality of accounts, wherein the one or more instructions that cause the at least one processor to determine, combined plurality of accounts, cause the at least one processor to:

determine a plurality of exposed accounts, wherein each account of the plurality of exposed accounts is associated with an event time period of a plurality of event time periods, wherein each event time period of the plurality of event time periods is associated with a time period during which the account was exposed to an event associated with a merchant, wherein the event associated with the merchant is an offer associated with a loyalty program of the merchant or enrollment in the loyalty program of the merchant, and determine a plurality of control accounts, wherein each account of the plurality of control accounts conducted at least one transaction involving the merchant during at least one event time period of the plurality of event time periods;

determine, for each account of the combined plurality of accounts, aggregate transaction data associated with a plurality of transactions involving each account during a time interval;

determine a first cohort level group of accounts, wherein the first cohort level group of accounts comprises a group of exposed accounts and a group of control accounts that are associated with a first specified event time period of the plurality of event time periods;

determine a first segment level group of accounts from the first cohort level group of accounts based on an indication of whether the account is an existing account or a new account;

generate a prediction model based on a plurality of control accounts that are included in the first segment level group of accounts, wherein the prediction model is configured to output a prediction score that represents an amount of spending involving an account after the first specified event time period, wherein, the one or more instructions that cause the at least one processor to generate the prediction model, cause the at least one processor to:

determine a plurality of modeling variables for each account of the group of control accounts included in the first cohort level group of accounts, wherein the plurality of modeling variables comprises:

a number of transactions initiated using the account that involve the merchant during the first specified event time period;

a number of transactions initiated using the account that involve the merchant during a time period that is before the first specified event time period;

a number of transactions initiated using the account that involve the merchant during a time period that is after the first specified event time period;

determine a variable importance metric associated with each modeling variable of the plurality of modeling variables;

exclude one or more modeling variables of the plurality of modeling variables based on the variable importance metric associated with the one or more modeling variables of the plurality of modeling variables to provide a subset of modeling variables;

train the prediction model based on the subset of modeling variables;

calculate an error term based on training the prediction model; and update one or more weights of the prediction model based on the error term;

identify a first exposed account of a plurality of exposed accounts that are included in the first segment level group of accounts;

determine a first control account of the plurality of control accounts that are included in the first segment level group of accounts that corresponds to the first exposed account using the prediction model; and output a report comprising data associated with the first control account that corresponds to the first exposed account.

9. The computer program product of claim 8, wherein the group of exposed accounts comprises a group of accounts that were exposed to a first event associated with the merchant during the first specified event time period, and wherein the group of control accounts comprises a group of accounts that conducted at least one transaction involving the merchant during the first specified event time period.

10. The computer program product of claim 8, wherein the one or more instructions that cause the at least one processor to determine the combined plurality of accounts, cause the at least one processor to:
   determine, for each account of the plurality of accounts, a distance between a merchant location of the merchant associated with the event and an address associated with an account;
   determine that the distance between the merchant location of the merchant associated with the event and the address associated with an account of the plurality of accounts satisfies a threshold value of distance; and
   include the account in the combined plurality of accounts based on determining that the distance between the merchant location of the merchant associated with the event and the address associated with the account satisfies the threshold value of distance.

11. The computer program product of claim 8, wherein the one or more instructions that cause the at least one processor to determine, for each account of the combined plurality of accounts, aggregate transaction data associated with the plurality of transactions involving each account during the time interval, cause the at least one processor to:
   create an aggregate transaction data table that includes aggregate transaction data associated with a plurality of transactions during each event time period of a plurality of event time periods involving each account of the combined plurality of accounts;
   determine an initial event time period of the plurality of event time periods, wherein the initial event time period is a beginning of the time interval;
   determine a final event time period of the plurality of event time periods, wherein the final event time period is an end of the time interval; and
   determine, for each account of the combined plurality of accounts, aggregate transaction data associated with the plurality of transactions involving each account during the time interval based on aggregate transaction data associated with the plurality of transactions involving each account between the initial event time period and the final event time period.

12. The computer program product of claim 8, wherein the one or more instructions further cause the at least one processor to:
   determine cohort aggregate transaction data for each account of the first cohort level group, wherein the cohort aggregate transaction data includes aggregate transaction data associated with a plurality of transactions, which involve each account included in the group of exposed accounts and control accounts that are associated with the first specified event time period, during the first specified event time period associated with the first cohort level group.

13. A method, comprising:
   determine, with at least one processor, a combined plurality of accounts, wherein determining the combined plurality of accounts comprises:
      determining a plurality of exposed accounts, wherein each account of the plurality of exposed accounts is associated with an event time period of a plurality of event time periods, wherein each event time period of the plurality of event time periods is associated with a time period during which the account was exposed to an event associated with a merchant, wherein the event associated with the merchant is an offer associated with a loyalty program of the merchant or enrollment in the loyalty program of the merchant, and
      determining a plurality of control accounts, wherein each account of the plurality of control accounts conducted at least one transaction involving the merchant during at least one event time period of the plurality of event time periods;
   determining, with at least one processor and for each account of the combined plurality of accounts, aggregate transaction data associated with a plurality of transactions involving each account during a time interval;
   determining, with at least one processor, a first cohort level group of accounts, wherein the first cohort level group of accounts comprises a group of exposed accounts and a group of control accounts that are associated with a first specified event time period of the plurality of event time periods;
   determining, with at least one processor, a first segment level group of accounts from a first cohort level group of accounts based on an indication of whether the account is an existing account or a new account;
   generating, with at least one processor, a prediction model based on a plurality of control accounts that are included in the first segment level group of accounts, wherein the prediction model is configured to output a prediction score that represents an amount of spending involving an account after the first specified event time period, wherein generating the prediction model comprises:
      determining a plurality of modeling variables for each account of the group of control accounts included in the first cohort level group of accounts, wherein the plurality of modeling variables comprises:
         a number of transactions initiated using the account that involve the merchant during the first specified event time period;
         a number of transactions initiated using the account that involve the merchant during a time period that is before the first specified event time period;
         a number of transactions initiated using the account that involve the merchant during a time period that is after the first specified event time period;
      determine a variable importance metric associated with each modeling variable of the plurality of modeling variables;
      exclude one or more modeling variables of the plurality of modeling variables based on the variable importance metric associated with the one or more modeling variables of the plurality of modeling variables to provide a subset of modeling variables;
      train the prediction model based on the subset of modeling variables;
      calculate an error term based on training the prediction model; and
      update one or more weights of the prediction model based on the error term;
   identifying, with at least one processor, a first exposed account of a plurality of exposed accounts that are included in the first segment level group of accounts;

determining, with at least one processor, a first control account of the plurality of control accounts that are included in the first segment level group of accounts that corresponds to the first exposed account using the prediction model; and outputting, with at least one processor, a report comprising data associated with the first control account that corresponds to the first exposed account.

14. The method of claim 13, further comprising:
determining cohort aggregate transaction data for each account of the first cohort level group, wherein the cohort aggregate transaction data includes aggregate transaction data associated with a plurality of transactions, which involve each account included in the group of exposed accounts and control accounts that are associated with the first specified event time period, during the first specified event time period associated with the first cohort level group.

15. The method of claim 13, further comprising:
identifying each account of the first cohort level group as being associated with an existing customer or as being associated with a new customer.

16. The method of claim 13, wherein determining the first segment level group of accounts from the first cohort level group of accounts comprises:
determining the first segment level group of accounts from the first cohort level group of accounts based on the indication that the account is part of the post-event segment of accounts and the indication that the account is an existing account; and wherein generating the prediction model based on the plurality of control accounts that are included in the first segment level group of accounts comprises:
generating the prediction model based on the plurality of control accounts that are part of the post-event segment of accounts and that are existing accounts.

* * * * *